(12) United States Patent
Hamilton, II et al.

(10) Patent No.: US 8,589,076 B2
(45) Date of Patent: Nov. 19, 2013

(54) POWER USAGE PLANNING FOR A VEHICLE

(75) Inventors: Rick A. Hamilton, II, Charlottesville, VA (US); James R. Kozloski, New Fairfield, CT (US); Brian M. O'Connell, Research Triangle Park, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 13/232,182

(22) Filed: Sep. 14, 2011

(65) Prior Publication Data

US 2013/0066552 A1 Mar. 14, 2013

(51) Int. Cl.
*G08G 1/123* (2006.01)
*B60L 9/00* (2006.01)
*H02J 7/16* (2006.01)

(52) U.S. Cl.
USPC .............. 701/532; 701/22; 701/410; 320/109

(58) Field of Classification Search
USPC ............... 701/22, 410, 532, 533; 180/68.235; 903/902–960; 320/109
See application file for complete search history.

(56) References Cited

U.S. PATENT DOCUMENTS

| 5,717,893 | A  * | 2/1998  | Mattson ..................... 711/129 |
| 5,892,346 | A  * | 4/1999  | Moroto et al. ................ 318/587 |
| 7,665,559 | B2 * | 2/2010  | De La Torre-Bueno ... 180/65.29 |
| 7,679,336 | B2   | 3/2010  | Gale et al. |
| 7,747,739 | B2   | 6/2010  | Bridges et al. |
| 7,792,613 | B2   | 9/2010  | Kressner et al. |
| 7,849,944 | B2   | 12/2010 | DeVault |
| 8,014,914 | B2 * | 9/2011  | Boss et al. ..................... 701/22 |
| 8,214,122 | B2 * | 7/2012  | Krupadanam et al. ......... 701/79 |
| 8,301,323 | B2 * | 10/2012 | Niwa .............................. 701/22 |
| 2006/0270454 | A1 | 11/2006 | Gotfried et al. |
| 2009/0030712 | A1 | 1/2009  | Bogolea et al. |
| 2009/0048716 | A1 | 2/2009  | Marhoefer |
| 2009/0304101 | A1 | 12/2009 | LoPorto et al. |
| 2010/0141431 | A1 | 6/2010  | Boss et al. |
| 2010/0228415 | A1 | 9/2010  | Paul |
| 2010/0241301 | A1 | 9/2010  | Yang |

(Continued)

FOREIGN PATENT DOCUMENTS

| JP | 10170293 | 6/1998 |
| JP | 2006112932 A | 4/2006 |

OTHER PUBLICATIONS

IPCOM000019547D; "Optimization of Vehilce Electrical Arichitecture, Its Electrical Energy Management and Demand Reduction"; 7 pages; Sep. 18, 2003.

(Continued)

*Primary Examiner* — John Walters
*Assistant Examiner* — James Triggs
(74) *Attorney, Agent, or Firm* — Cantor Colburn LLP; Vazken Alexanian

(57) ABSTRACT

A method for providing route plans for a plug-in hybrid electric vehicle (PHEV) includes: receiving a destination from a user of the PHEV; determining a route from a current location of the PHEV to the destination; determining locations of one or more external power sources that can provide power to recharge batteries of the PHEV and that are located along the route; forming, with a computing device, a travel plan that includes at least one of: planned recharging stops selected from the locations, modes of operation for the PHEV along the route, and an order in which power provided by the external sources is used by the PHEV.

24 Claims, 3 Drawing Sheets

(56) References Cited

U.S. PATENT DOCUMENTS

2011/0010032 A1   1/2011   Kozarekar et al.
2011/0264317 A1*  10/2011  Druenert et al. ............... 701/22

OTHER PUBLICATIONS

IPCOM000183929D; "Mechanism of Electronic Suspension and Suspension Energy Capture"; 5 pages; Jun. 5, 2009.

IPCOM000199937D; "A Token-based System and Method for Managing a Network of Plugin Hybrid Electric Vehicles"; 21pages; Sep. 21, 2010.

IPCOM000203787D; "Optimized Control of EV (Electric Vehicle) Battery Charging"; 5 pages; Feb. 2, 2011.

International Search Report and Written Opinion dated Nov. 8, 2012 for Application No. PCT/CN2012/079400.

* cited by examiner

POWER USAGE PLANNING FOR A VEHICLE

BACKGROUND

The present invention relates to energy usage and, and more specifically, the usage and recharging of electric power in a vehicle based on the source of the power.

Hybrid vehicles combine a conventional internal combustion engine (ICE) and an electric motor. The electric motor is driven by rechargeable batteries. The batteries can be charged by the ICE (when running) or by regenerative braking of the electric motor. A particular type of hybrid vehicle, referred to as a "plug-in hybrid electrical vehicle" (PHEV), includes a third manner of charging the batteries. In particular, PHEVs include a plug or other implement that allows the batteries to be charged from an external electrical power source (e.g., the power grid). Thus, both liquid fuels (e.g., gasoline or diesel used by the ICE) and the electrical power grid can provide power for recharging the batteries.

In view of the fact that electrical power can be produced in several different manners, the range of actual energy sources for recharging the batteries is virtually limitless. These sources include, but are not limited to, gasoline, diesel, ethanol, plants that produce electricity by burning coal or other fossils fuels, nuclear power plants, solar or wind power generation facilities or hydroelectric sources.

In the context of external power sources, the electricity used to recharge the battery can actually come from many sources, depending on the time of day or location of the vehicle. For example, in one region of the country, hydroelectric power may be prevalent. This is a form of "clean" energy. However, in another region of the country, coal may be used. Thus, the recharging of electric vehicle batteries may be considered relatively "green" (e.g. low carbon creation) or "not green" (e.g. high carbon creation) depending on the location of the vehicle. This means that the same vehicle might be considered to have low environmental impact or high environmental impact depending on the source of electricity used to charge the batteries.

SUMMARY

According to one embodiment of the present invention, a method for providing route plans for a plug-in hybrid electric vehicle (PHEV) is disclosed. The method of this embodiment includes: receiving a destination from a user of the PHEV; determining a route from a current location of the PHEV to the destination; determining locations of one or more external power sources that can provide power to recharge batteries of the PHEV and that are located along the route; and forming, with a computing device, a travel plan that includes at least one of: planned recharging stops selected from the locations, modes of operation for the PHEV along the route, and an order in which power provided by the external sources is used by the PHEV.

According to another embodiment, a system for reducing environmental impact of a plug-in electric vehicle (PHEV) is disclosed. The system of this embodiment includes a source signature component that stores source signatures for power stored in an energy storage element of the PHEV and a route planning component that forms a route for the PHEV between a current location of the PHEV and a destination. The system of this embodiment also includes an external source power identifier component that includes information describing a source of power for electricity dispensed by external power sources and a recharge planner that identifies one or more external sources from the external source power identifier component that are located along the route as possible recharge locations to form a recharge plan. The system of this embodiment further includes a recharging optimizer that, based on the route and the recharge plan, selects one or more of recharge locations along the route, an order of stored power utilization, and order of source signature retiring to achieve one or more goals to form a travel plan.

According to yet another embodiment, a method of offsetting carbon consumption is disclosed. The method of this embodiment includes: analyzing, with a computing device, a travel plan for a plug-in hybrid electric vehicle (PHEV) to determine a carbon offset for the PHEV; storing the carbon offset; and providing the carbon offset to a third party.

According to yet another embodiment, a method of managing carbon consumption between a plurality of plug-in electric vehicles (PHEVs) is disclosed. The method of this embodiment includes: storing at a computing device charge signatures for electrical power stored in at least a first PHEV and a second PHEV of the plurality of PHEVs; and transferring a first charge signature from the first PHEV to the second PHEV.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As generally described above, PHEVs include batteries that can be charged with electrical power formed from different sources. The impact of each of these power sources on the environment is different, especially with regard to a measure (fossil carbon emitted) that has grown in importance due to its inclusion in models that predict global warming. Thus, it can be recognized that PHEV environmental impact varies based on the source of power used to charge its batteries.

Embodiments of the present invention provide systems and methods that allow a PHEV to manage its power consumption to control (e.g., minimize or otherwise reduce) the environmental impact of operating the PHEV. Such systems and methods utilize signatures that identify the source, or sources, of power used to charge the batteries of the PHEV. According to one embodiment, the management of environmental impact can include one or more of: a model of expected fuel consumption; future fuel source availability; and a system for trading "carbon credits" with others.

Figure 1:
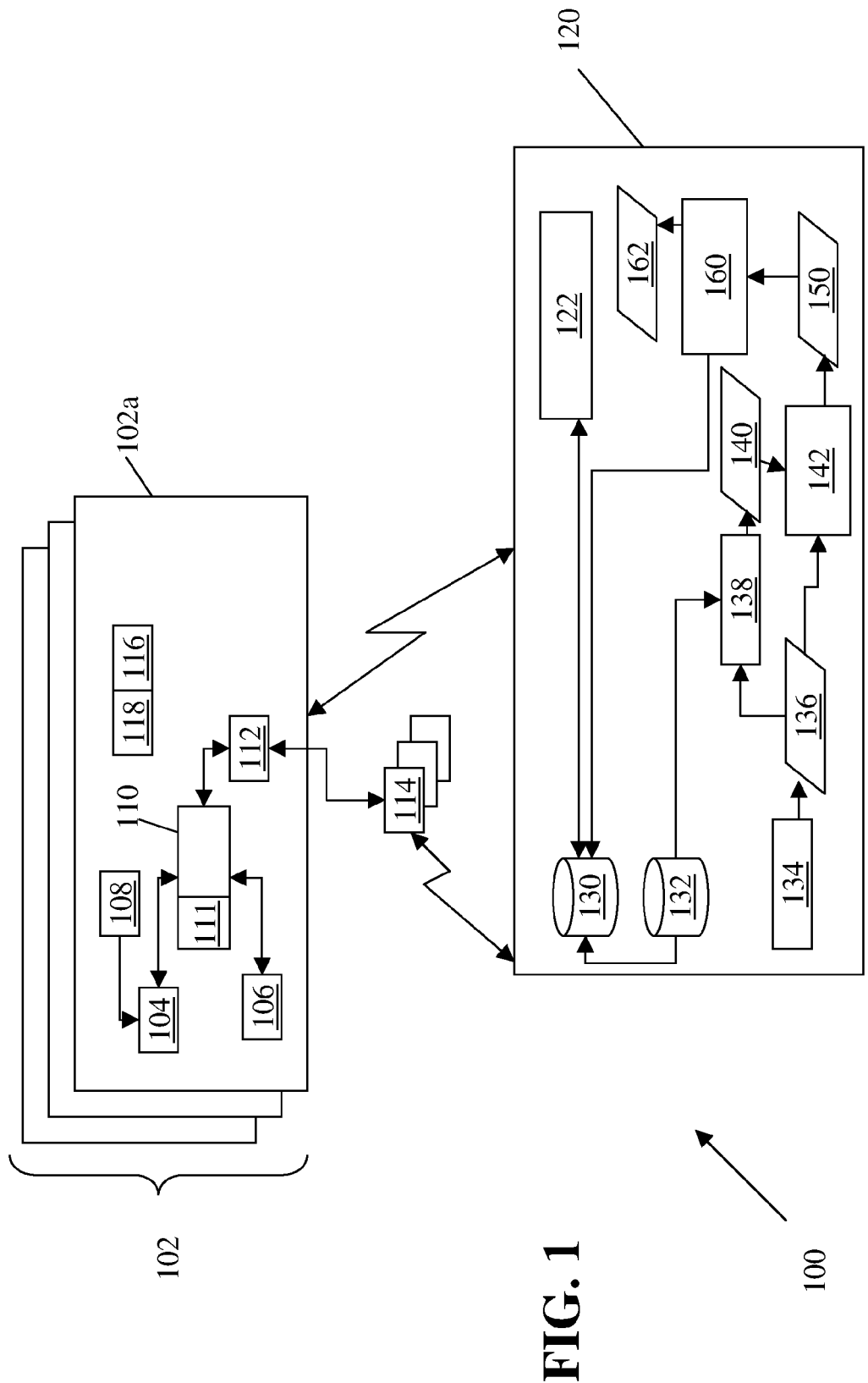
FIG. 1 is a block diagram of system for management of PHEV operation according to one embodiment.

Referring now to FIG. 1, a system 100 that includes a plurality of PHEVs 102 is illustrated. For sake of clarity, only one PHEV 102*a* is described in detail but it shall be understood that one or more of the other PHEVs 102 can include some or all of the components described with respect to PHEV 102*a*.

As illustrated, PHEV 102*a* includes a first engine 104 and a second engine 106. The PHEV 102 also includes one or more wheels (not shown) that can be driven by one or both of the first and second engines 104, 106. In one embodiment, the first engine 104 generates locomotive power by utilizing a fuel stored in a first power storage element 108. In one embodiment, the first engine 104 is an ICE. In such an embodiment, the first power storage element 108 can be used to store a liquid fuel such as gasoline, diesel, ethanol or any other type of liquid or gaseous fuel either now known or later developed that can be used to operate an ICE. As such, in one embodiment, the first storage element 108 is a fuel tank and may be referred to as such from time to time herein.

In one embodiment, the second engine 106 is an electric motor. The second engine 106 utilizes electrical power stored in a second power storage element 110. The second power storage element 110 can be any element or combination of elements that can store electrical power. For example, the second power storage element 110 can comprise one or more rechargeable batteries or one or more fuel cells. At times herein, the second power storage element 110 is referred to as "batteries" for convenience. Regardless of the particulars of the second power storage element 110, in one embodiment, the second power storage element 110 can be recharged from either or both of the first engine 104 and the second engine 106. For example, in the event the first engine 104 is an ICE, the ICE can drive an alternator that provides electrical power to the second power storage element 110 to recharge it. Similarly, in the event that the second engine 106 is an electric motor, during regenerative braking, the second engine 106 can provide power back to the second power storage element 110. The exact operation of how power is drawn from and provided to the second storage element 110 by the first and second engines 104, 106 is known in the art and is assumed herein to be within the knowledge of the skilled artisan.

The PHEV 102*a* can also include an adapter 112 configured to mate with any of one or more external power sources 114 and that is electrically coupled to the second power storage element 110. The external power sources 114 could be, for example, an outlet or connection that is coupled to a power grid. The external power source 114 could be located, for example, at a residential dwelling or at a commercial power provision station (recharging station) that sells power to recharge PHEV batteries or other electrical devices. In one embodiment, the external power source 114 is an electric generator. Power from the external power sources 114 is used to recharge the second power storage element 110. As illustrated in FIG. 1, in one embodiment, the second power storage element 110 can also be configured to provide power to the external power source 114 through adapter 112 to allow PHEVs to share charge if needed. That is, one PHEV 102 could be an external power source 114 for another PHEV 102.

PHEVs can be operated in several different modes. These modes define the blend of power consumed by PHEV 102 from either first 108 or second 110 power storage elements. In the following explanation, the following assumptions are made: the first engine 104 is an ICE and the first power storage element 108 is a liquid fuel tank; and the second engine 106 is an electric motor and the second power storage element 110 includes one or more batteries.

The modes can include a "charge-depleting mode" where the PHEV 102*a* is allowed to operate exclusively (or depending on the vehicle, almost exclusively, except during hard acceleration) on electric power (e.g., solely with the second engine 106) until a charge state of the batteries 110 is depleted to a predetermined level. Once depleted, the ICE 104 can be used. In a "blended mode", it is assumed that operation at high speeds could not be sustained by the electric motor 106 alone. In such instances, both the ICE 104 and the electric motor 106 are utilized. In a "charge-sustaining mode" (used by production hybrid vehicles (HEVs) today), the operation of the PHEVs 102*a* two engines 104, 106 are combined in such a manner that the PHEV 102*a* is operating as efficiently as possible without allowing the charge of the batteries 110 to move outside a predetermined narrow band. Another mode, referred to as a "mixed mode," can include a combination of any of the above modes. For example, PHEV 102*a* may travel 5 miles (8 km) at low speed in a charge-depleting mode, then enter on to a freeway and operate in blended mode for 20 miles (32 km). Finally, the PHEV 102*a* may leave the freeway and drive for another 5 miles (8 km) without the ICE 104 until the all-electric range is exhausted. At this point, the PHEV 102*a* can revert back to a charge sustaining mode for another 10 miles (16 km) until the final destination is reached. Such a trip would be considered a mixed mode, as multiple modes are employed in one trip.

The determination and selection of an optimal operating mode(s) for a PHEV is currently performed based on the expected fuel consumption (based on acceleration and speed) and desired operational range as described above. In FIG. 1, a mode controller 116 is illustrated that controls the operating modes of the PHEV 102*a*. The PHEV 102*a* can include a route determination module 118 that allows the user to enter information about the operational range. For instance, the route determination module 118 could allow the user to enter a desired destination. In addition, the route determination module 118 also includes programming or other elements that allow it to determine one or more possible routes between the current location of the PHEV 102*a* and the desired destination. In such a case, route determination module 118 could be a global positioning system (GPS) navigation device having either presently available or later developed capabilities. In addition, route determination module 118 could provide additional parameters such as shortest or fastest route and changes in elevation during the trip. It shall be understood that the route determination module 118 could be included in combination with the route planning component 134 describe below or it could take the place of that component. In one embodiment, the GPS functionality of route determination module 118 could be omitted and all route planning performed by the route planning component 134.

In one embodiment, the system 100 also includes a power usage controller 120. The power usage controller 120 can be in operative communication with one or all of the PHEVs 102 and one or more of the external power sources 114. The communication can be wireless, wired, or a combination thereof and can travel through one or more networks. In FIG. 1, the power usage controller 120 is illustrated as an element of the system 100 and includes data flow information to support explanation of one or more methods according to embodiments of the invention disclosed herein.

In one embodiment, the external power sources 114 can provide information to the power usage controller 120 about the source that produced the electricity (e.g., whether the electricity was produced by wind or coal) that was provided to a particular PHEV 102. Such a source is referred to herein as a "signature." In another embodiment, such information is provided to the PHEV 102*a* by the external source 114 and then provided to the power usage controller 120 by the PHEV 102*a*. To that end, in one embodiment, the second power storage element 110 can include a meter 111 that determines its current power level as well as an identification of the source(s) of the power contained therein. It shall be understood the sources can include external sources 114 or the ICE 104. In one embodiment, the source identification can also, or alternatively, include a signature.

In one embodiment, the power usage controller 120 is a collection of systems that can communicate information between them. The power usage controller 120 can store, for each external power source 114, the source(s) used to generate the electricity (e.g., its signature) at a given time. In this manner, the signatures of the charge in batteries for each PHEV 102 can be stored and utilized in one or more of the manners described below.

The problem of optimizing the mode of operation based on minimizing environmental impact is significant, especially given the wide variety of power sources a PHEV 102 can utilize. In addition, the optimal mode of power utilization depends not only on the current use profile of the particular PHEV 102a and expected use based on route and range specifications (e.g., the route determined by module 118), but also on the expected future availability of specific power sources (for example "green" sources such as solar and wind vs. "non-green" sources such as coal and gasoline). Finally, given that different PHEVs 102 can at any given moment have stored in them power from different sources, the exchange of power between vehicles can make this optimization easier or more difficult depending on the constraints imposed by these power storage profiles for different vehicles. Each of these factors makes minimizing environmental impact a difficult problem, requiring a complex optimization across a variety of known and estimated variables.

To that end, the power usage controller 120 can be utilized to monitor, reduce or minimize environmental impact of the PHEVs 102. According to one embodiment, the controller 120 maintains a dynamic database of power source signatures which can then be used to perform an ongoing optimization aimed at minimizing environmental impact and by determining which mode of power source utilization a PHEV 102 should employ at any given moment. Because traditional hybrid vehicles derive all of their power from gasoline (or a gasoline/ethanol mixture), there is no need for such an optimization in traditional hybrid operation. Furthermore, current art in setting modes for PHEV only considers power utilization, desired range and speed/acceleration parameters. In one embodiment, the power usage controller 120 can take these parameters into account and, also, minimize or otherwise reduce environmental impact. It will be appreciated, that due to the power usage controller 120 disclosed herein, methods for minimizing or otherwise reducing environmental impact across a pool of PHEVs can be achieved by allowing the vehicles or other users to exchange power signatures for charge in their batteries through a remote clearinghouse 122.

The power usage controller 120 illustrated in FIG. 1 includes a source signature component 130. The source signature component 130 includes, in one embodiment, a set of power source signatures collected from the external sources 114 to identify the ultimate source of electric power used to charge the battery 110 of a particular PHEV 102 (wind, solar, coal, etc.). In one embodiment, the source signature component 130 also includes an identification of the fuel in the tank 108 of particular, PHEVs 102. Thus, the source signature component 130 includes, in one embodiment, the amount and source(s) of the electrical power stored in the batteries 110 of particular PHEVs 102 as well as its self contained ability to generate additional power for locomotion and/or battery charging (e.g. the power from liquid fuel). In one embodiment, the source signature component 130 is a relational database, such as IBM DB2. This information is accessed by other components to assist various operations discussed below.

The controller 120 can also include an external source power identifier component 132. This external source power identifier component 132 can include information about particular external power sources 114 (e.g., charging stations). This information can include information describing the origin of power at specific times of day. This information may be derived directly from the power company via dedicated communication links, or stored by the buyer of the power (i.e. the owner of the charging station) in a database that is queried whenever a charge is requested by a PHEV 102 or periodically. The database may reside on a disk or flash drive in the charging station, or other locations as mentioned above. Information from this database may be transmitted to the meter 111 in the PHEV 102a in some cases. It shall be understood that the information in the external source power identifier component 132 can be used to derive information for inclusion in the source signature component 130, if needed. That is, when charging, the PHEV 102a could inform the controller 120 an amount of power received and where from. The controller 120 could then consult the external source power identifier component 132 to determine the signature of the power to store in the source signature component 130.

The controller 120 also includes a route planning component 134. The route planning component 134 could be a GPS in the PHEV 102 or a web-based tool. In general, the route planning component 134 includes elevation, distance, and speed estimates at various points along a desired route and is generally used to plan the route of the PHEVs 102 for one or more trips. For example, a user may specify a desired destination, or a sequence of destinations, through module 118 and that information is provided to the route planning component 134. Similar to a GPS navigation system, the route planning component 134 can generate a route 136 to get to the destinations. As shown, the route is generated by a route planning component 134. Of course, the route 136 could be calculated by module 118 and provided to the controller 120.

Based on the route 136, a recharge plan 140 can be produced by a recharge planner 138 of the illustrated controller 120. The recharge plan 140 identifies one or more external power sources 114 (e.g., charging stations) along the route 136. In one embodiment, the selection of external power sources 114 takes into account information in the external source power identifier component 132 to determine the signatures of power that will be provided by sources 114 that exist along the route 136.

In one embodiment, the controller 120 includes a recharging optimizer 142 that takes into account the route 136, current and expected speed and acceleration from the PHEV 102 and/or the route 136, current charge (meter 111) and fuel level in the tank 108, and the recharge plan 140 to achieve one or more goals. The goals can be achieved by providing a travel plan 150 that includes one or more of expected recharge locations, speed/accelerations, and operating mode recommendations to be followed by the mode controller 116. The goals can include, for example, one or more of: minimizing environmental impact; attaining a particular range of travel; maintaining a particular speed and acceleration within some parameters (e.g., the driver prefers to drive at 50 mph, and the system infers from past driving habits, or the driver enters this information); and maintaining the charge in the batteries 110 in a particular state (e.g., either at a particular level of charge or at a particular rate of discharge).

In one embodiment, the travel plan 150 can include mode selection instructions that provide the mode selector 116 with suggestions/commands to minimize environmental impact during a particular trip. For example, in some cases, it may be preferable for the driver to use liquid fuel in the tank 108 only, because, for example, an electric charge would be coming from coal.

In one embodiment, the travel plan 150 can be a dynamic element that is changed if, for example, the driver deviates from the travel plan 150. After being changed, the travel plan 150 may be referred to as a "modified travel plan" herein. In addition, the travel plan 150 can include accessory component operation commands. Consider the case where the driver has deviated from the travel plan 150. In such a case, the travel plan 150 may no longer result in the PHEV 102a reaching a required recharging location with its current charge/liquid fuel. In such a case, the accessory component operation commands can adjust operation of the PHEV 102a by varying the operation of accessories such as fans, a climate control set point, power consumed by interior lights and the like to preserve charge in the batteries in order to reach the destination.

In one embodiment, the controller 120 can optionally include a carbon-offset module 160. The carbon offset module 160 can be configured to alter the travel plan 150 to meet certain environmental constraints of the user of a particular PHEV to produce a revised travel plan 162. For instance, assume the driver of the PHEV 102a has agreed to participate in a carbon offset plan. That driver may agree to reducing speed or acceleration along the original travel plan 150 in order to generate a credit. In such a case, the revised travel plan can vary the speed/acceleration recommendations in the travel plan 150 to form a revised travel plan 162. In one embodiment, the amount of carbon offset between the travel plan 150 and the revised travel plan 162 is stored for each PHEV in the source signature component 130. That is, the reduction in carbon emissions between the travel plan 150 and the revised travel plan 162 could determine an amount of offset that can be stored for the PHEV. The amount of carbon offset could be determined in other manners. For example, the amount of carbon offset could be determined based on carbon saving of utilizing a PHEV as compared to an ICE vehicle or could be based on utilizing the PHEV according to the travel plan 150 as compared to utilizing the PHEV in an ICE only mode. It shall be understood that many different other methods could be utilized to determine an amount of carbon offset to be credited to a particular PHEV.

Carbon offsetting can be used to offset carbon emissions from one party with savings of another. For example, some companies will plant trees on behalf of companies that produce greenhouse gases to offset those gases (for a fee, of course). According to one embodiment, the carbon offset of the PHEV 102 stored in the source signature component 130 could be used in the same manner. In such a case, an offset company can provide clearing house 122 where owners of PHEVs 102 can either voluntarily or for a fee agree to provide their credits to offset emissions of others.

It is foreseeable that vehicles can include carbon caps that limit the carbon associated with a particular vehicle. These caps can include the amount of carbon liberated by burning liquid fuel as well as that liberated by the production of the electricity used to recharge the batteries. As energy is used from the batteries, the source of the energy can be applied against the cap with "greener" sources counting less. In such a case, the order in which source charges are retired (e.g., used) can become important. For example, if a particular PHEV is being used more than others, it may need to retire only green sources. Similarly, if a PHEV is seldom being used, it may be able to retire less green sources. In such a case, the clearing house 122 could be configured to allow sources to be traded, sold or otherwise transferred between individual PHEVs 102.

Figure 2:
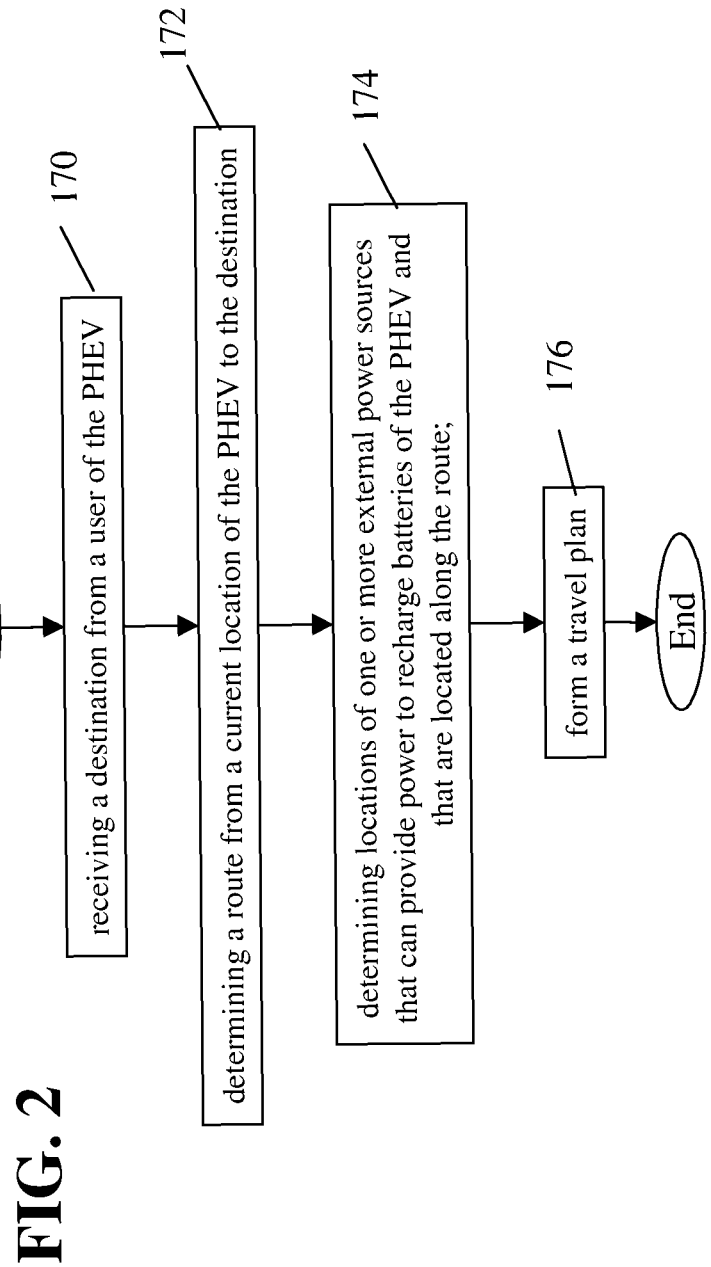
FIG. 2 is flow chart illustrating one method according to the present invention.

FIG. 2 is flow chart illustrating one method according to the present invention. The method shown in FIG. 2 can be used to provide route plans for a plug-in (PHEV) and includes receiving a destination from a user of the PHEV at block 170. At block 172, a route from a current location of the PHEV to the destination is determined and, at block 174, locations of one or more external power sources that can provide power to recharge batteries of the PHEV and that are located along the route are determined. At block 176, a travel plan is formed that that includes at least one of: planned recharging stops selected from the locations and modes of operation for the PHEV along the route.

Figure 3:
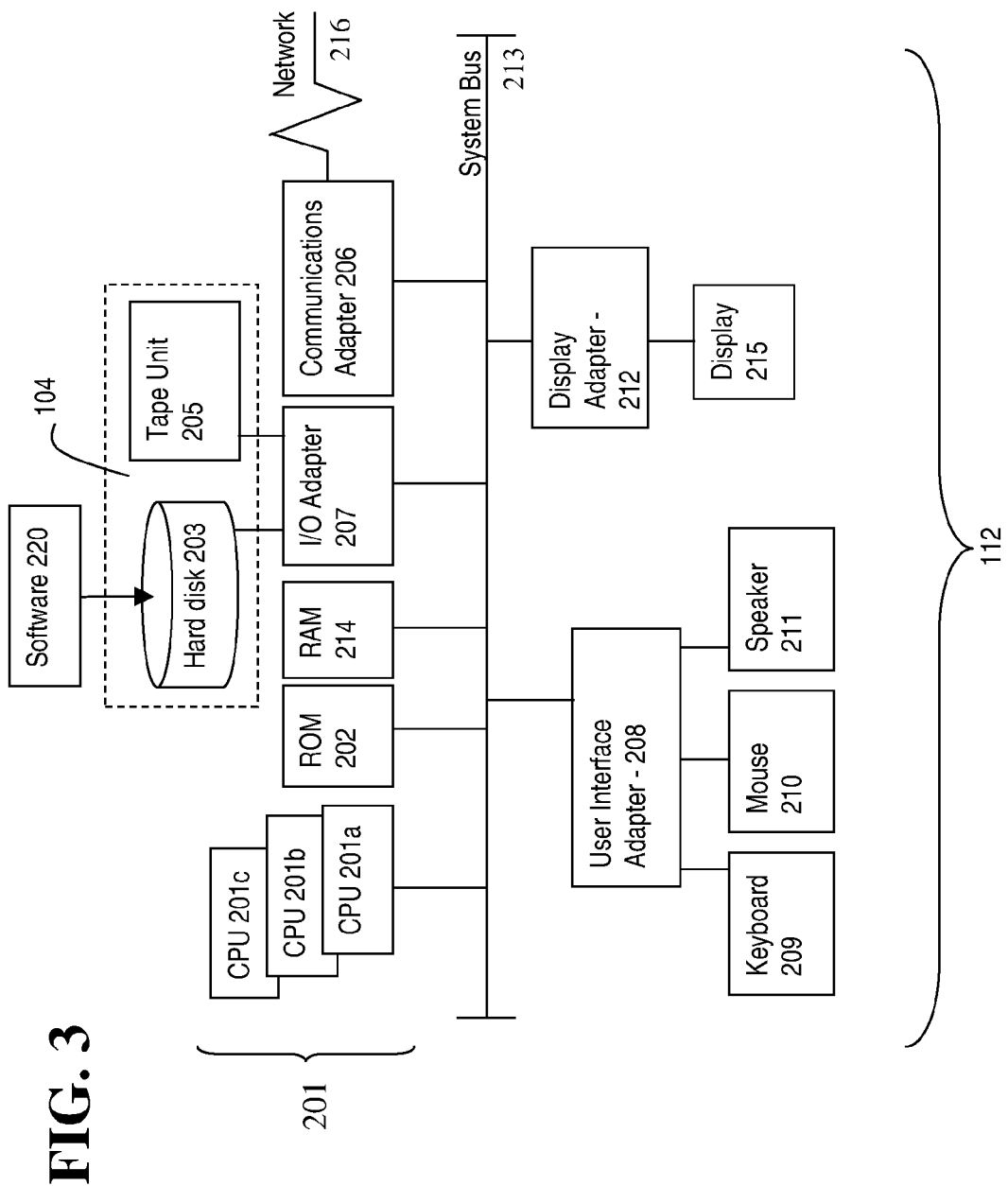
FIG. 3 is a system diagram for a processing system on which embodiments of the present invention may be performed.

FIG. 3 shows an example of a computing system 200 on which embodiments of the present invention may be implemented. In particular, the system 200 could be utilized to form a controller 120 in one embodiment. In the illustrated embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to the system memory 214 and various other components via a system bus 213. Read only memory (ROM) 202 is coupled to the system bus 213 and may include a basic input/output system (BIOS), which controls certain basic functions of the system 200.

FIG. 3 further depicts an input/output (I/O) adapter 207 and a network adapter 206 coupled to the system bus 213. The I/O adapter 207 may be a small computer system interface (SCSI) adapter that communicates with a hard disk 203 and/or tape storage drive 205 or any other similar component. The I/O adapter 207, hard disk 203, and tape storage device 205 are collectively referred to herein as mass storage 204. A network adapter 206 interconnects the bus 213 with an outside network 216 enabling the computing system 200 to communicate with other such systems. A screen (e.g., a display monitor) 215 is connected to the system bus 213 by a display adapter 212, which may include a graphics adapter to improve the performance of graphics intensive applications and a video controller. In one embodiment, adapters 207, 206, and 212 may be connected to one or more I/O busses that are connected to the system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to the system bus 213 via the user interface adapter 208 and display adapter 212. A keyboard 209, mouse 210, and speaker 211 are all interconnected to the bus 213 via the user interface adapter 308, which may include, for example, a Super I/O chip integrating multiple device adapters into a single integrated circuit.

Thus, as configured in FIG. 3, the system 200 includes processing means in the form of processors 201, storage means including system memory 214 and mass storage 204, input means such as a keyboard 209 and mouse 210, and output means including a speaker 211 and display 215.

It will be appreciated that the system 200 can be any suitable computer or computing platform, and may include a terminal, wireless device, information appliance, device, workstation, mini-computer, mainframe computer, personal digital assistant (PDA) or other computing device. It shall be understood that the system 200 may include multiple computing devices linked together by a communication network. For example, there may exist a client-server relationship between two systems and processing may be split between the two.

The system 200 also includes a network interface 206 for communicating over a network 216. The network 216 can be a local-area network (LAN), a metro-area network (MAN), or wide-area network (WAN), such as the Internet or World Wide Web. Users of the system 200 can connect to the network through any suitable network interface 206 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

In view of the above, it shall be apparent that embodiments of the present invention can provide the technical effect of reducing carbon emissions by planning of resource utilization of a PHEV.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of a code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing route plans for a plug-in hybrid electric vehicle (PHEV), the method comprising:
   receiving a destination from a user of the PHEV;
   determining a route from a current location of the PHEV to the destination;
   determining locations of one or more external power sources that can provide power to recharge batteries of the PHEV and that are located along the route;
   determining a source of electric power provided by the external power sources; and
   forming, with a computing device, a travel plan that includes at least one of:
   modes of operation for the PHEV along the route and an order in which power provided by the external sources is used by the PHEV.

2. The method of claim 1, wherein the travel plan includes the planned recharging stops and forming includes:
   selecting the sources to minimize or reduce environmental impact of the PHEV traversing the route.

3. The method of claim 1, wherein the travel plan includes both the planned recharging stops and the modes of operation for the PHEV along the route and forming includes:
   selecting the sources and the modes of operation to minimize or reduce environmental impact of the PHEV traversing the route.

4. The method of claim 3, wherein the modes include at least one of: a charge-depleting mode; a blended mode; and charge-sustaining mode.

5. The method of claim 1, wherein the route is determined by a route planner located in the PHEV.

6. The method of claim 1, wherein the route is determined by a route planner located external to the PHEV.

7. The method of claim 1, further comprising:
   monitoring the location of the PHEV as it traverses the route;
   determining that the PHEV has deviated from the route; and
   forming a modified travel plan in response to the PHEV deviating from the route.

8. The method of claim 7, wherein the modified travel plan includes instructions that cause at least one accessory component of the PHEV to vary its operation.

9. A system for reducing environmental impact of a plug-in electric vehicle (PHEV), the system comprising:
   a source signature component that stores source signatures for power stored in an energy storage element of the PHEV;
   a route planning component that forms a route for the PHEV between a current location of the PHEV and a destination;
   an external source power identifier component that includes information describing a source of power for electricity dispensed by external power sources;
   a recharge planner that identifies one or more external sources from the external source power identifier component that are located along the route as possible recharge locations to form a recharge plan; and
   a recharging optimizer that, based on the route and the recharge plan, selects order of source signature retiring to achieve one or more goals to form a travel plan.

10. The system of claim 9, wherein the one or more goals include: minimizing environmental impact; attaining a particular range of travel; and maintaining a particular speed and acceleration.

11. The system of claim 9, wherein the travel plan includes mode selection instructions for the PHEV.

12. The system of claim 11, wherein the travel plan includes both the recharge locations and the modes of operation for the PHEV along the route and wherein the recharging optimizer forms the travel plan based on a source of electric power provided by the external sources and modes of operation to minimize or reduce environmental impact of the PHEV traversing the route.

13. The system of claim 12, wherein the modes include at least one of: a charge-depleting mode; a blended mode; and charge-sustaining mode.

14. The system of claim 9, wherein the route planning component is located in the PHEV.

15. The system of claim 9, wherein the route planning component is configured to monitoring the location of the PHEV as it traverses the route and to determine that the PHEV has deviated from the route, and wherein the recharging optimizer is configured to form a modified travel plan in response to the PHEV deviating from the route.

16. The system of claim 15, wherein the modified travel plan includes instructions that cause at least one accessory component of the PHEV to vary its operation.

17. A method of offsetting carbon consumption, the method comprising:

analyzing, with a computing device, a travel plan for a plug-in hybrid electric vehicle (PHEV) to determine a carbon offset for the PHEV;

storing the carbon offset; and providing the carbon offset to a third party.

18. The method of claim 17, wherein the third party is associated with another PHEV.

19. The method of claim 17, wherein the carbon offset is determined based on sources of power stored in a battery of the PHEV.

20. The method of claim 17, wherein the carbon offset is determined based on operating the PHEV in a mode that only utilizes an internal combustion engine of the PHEV.

21. A method of managing carbon consumption between a plurality of plug-in electric vehicles (PHEVs), the method comprising:

storing at a computing device charge signatures for electrical power stored in at least a first PHEV and a second PHEV of the plurality of PHEVs; and transferring a first charge signature from the first PHEV to the second PHEV.

22. The method of claim 21, further comprising:

transferring as second charge signature from the second PHEV to the first PHEV.

23. The method of claim 21, wherein the charge signatures are based on a method used to generate the electrical power.

24. The method of claim 21, further comprising:

retiring the first charge signature for the second PHEV.

\* \* \* \* \*